United States Patent Office 3,353,929
Patented Nov. 21, 1967

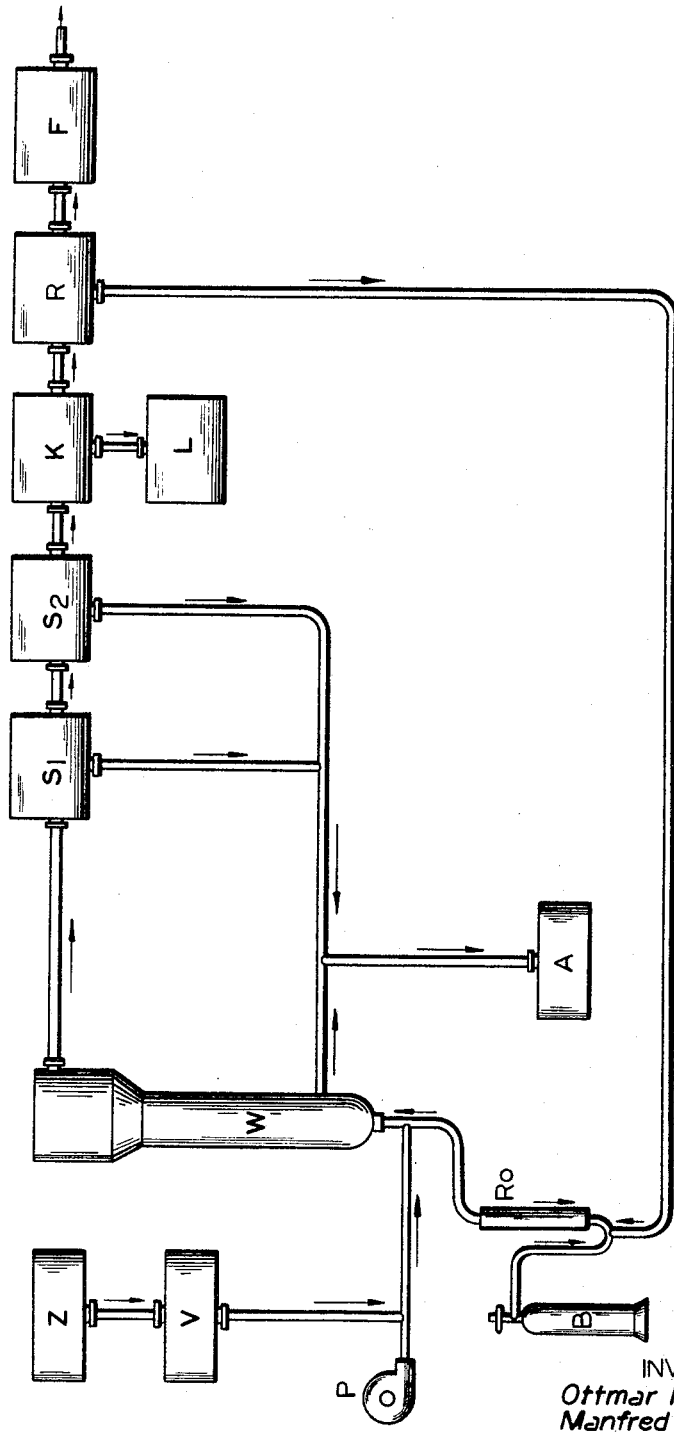

3,353,929
PROCESS FOR THE RECOVERY OF URANIUM FROM URANIUM-CONTAINING NUCLEAR FUELS AND THE LIKE
Ottmar Knacke, Aachen, and Manfred Laser, Erich Merz, and Hans-Jürgen Riedel, Julich, Germany, assignors to Kernforschungsanlage Julich des Landes Nordrhein-Westfalen, Julich, Germany, a German institute
Filed Oct. 20, 1965, Ser. No. 498,817
Claims priority, application Germany, Nov. 21, 1964, K 54,588
10 Claims. (Cl. 23—326)

Our present invention relates to a process for the recovery of uranium from uranium-containing nuclear fuels and the like.

Many processes for the recovery of enriched uranium or unreacted uranium from nuclear fuels and even from ores and the like have been suggested. This invention relates particularly to the recovery and concentration of uranium from nuclear fuels of the type described, for example, in the commonly assigned copending application Ser No. 498,786, filed October 20, 1965 by Alfred Boettcher, and other systems wherein uranium fuels are irradiated in a nuclear reactor with, for example, a neutron flux. The recovery of uranium from the irradiated product of a nuclear reactor such as a fuel element, is desirable for many reasons. Firstly, if the reactor is of the breeder type, the uranium recovered from the fuel elements are enriched with respect to fissionable material by comparison with the fuel elements as initially prepared. The fertile uranium can, after separation from the fuel element, be constituted as the fuel for further reactions or utilized for other applications. Secondly, depleted fuel elements frequently contain valuable quantities of uranium which, although not necessarily economical for further use in reactors without concentration, can be economically recovered and incorporated in other fuel elements. Thirdly, in the event of the fuel elements are highly radioactive as a consequence of the presence of an unstable uranium isotope, removal of uranium from the fuel element recovered from the nuclear reactor is essential to permit the fuel element and its component parts to be disposed of conveniently and without the precautions which are required for the handling of some nuclear-contamination residues.

For the foregoing reasons and others well-known in the field of nuclear engineering, it is a common desire to remove economically, conveniently and with simple apparatus uranium from uranium-containing nuclear fuels and the like in order to concentrate the uranium or otherwise isolate and recover it. One of the conventional processes used for this purpose involves the transformation of the irradiated fuel element into a liquid phase which is then subjected to treatment for recovery of uranium. As in all processes requiring this transformation, there is substantial expense involved and considerable problems with respect to efficiency and difficulties of performing the recovery operation. It has been proposed to treat, in the liquid phase, the fuel particles with halogen fluorides, e.g. bromine fluoride or chlorine fluoride, or with mixtures of halogen fluoride or nitrogen oxyfluoride. These processes have, of course, the disadvantages indicated above. It has also been proposed to fluorinate uranium-containing nuclear fuel by reaction of the uranium-containing product, in a molten-salt bath, with gaseous mixtures of hydrogen fluoride and fluorine. And, finally, to carry out a fluorination reaction with these compositions in a cyclone furnace or reactor. The latter process is highly advantageous inasmuch as radioactive detritus is removed in the cyclone process very efficiently and there is danger that the critical mass will be exceeded in the reaction. It is, however, disadvantageous inasmuch as fluorine, hydrogen fluoride and inter-halogen fluorides are highly corrosive even in parts of the apparatus remote from the actual reaction with the uranium compounds, and the fluorine gases are so highly toxic as to render them unusable in any practical application which must be overseen by service personnel. It has also been discovered that bromine fluoride and chlorine fluoride in the presence of moisture form explosive mixtures, a factor which has led to an avoidance of this method of fluorinating the uranium compounds.

It is the principal object of the present invention, therefore, to provide a method of recovering uranium from irradiated nuclear fuels and, more particularly, for extracting the uranium and concentrating it in the form of a uranium fluoride wherein the aforementioned disadvantages are avoided.

The objects and others, which will become apparent hereinafter, are attained, in accordance with the present invention, by a method of extracting uranium from uranium-containing irradiated nuclear fuels which involves the treatment of the uranium compound in the solid state with a gaseous mixture including sulfur hexafluoride which, we have discovered, reacts efficiently with the uranium compounds at temperatures upward of about 800° C. to fluorinate the uranium and yield uranium hexafluoride in substantially a single reaction step. While the reaction has been found to be effective with almost all uranium compounds commonly in use in nuclear fuels, it will be described hereinafter especially with respect to uranium oxide ($U_3O_8$ or $UO_2$) and uranium carbide ($UC_2$). The reaction can be described, according to its apparent characteristics, by the following relationship:

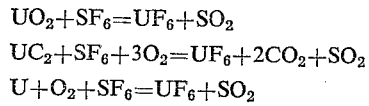

$$UO_2 + SF_6 = UF_6 + SO_2$$

$$UC_2 + SF_6 + 3O_2 = UF_6 + 2CO_2 + SO_2$$

$$U + O_2 + SF_6 = UF_6 + SO_2$$

It will thus be noted that it is a principle of the present invention to provide an oxidizing agent in the gaseous mixture especially where the treated substance contains the uranium in a form other than the oxide. The oxygen thus supplied is used both for combination with the carbon which may be present in the uranium compound itself or in a encapsulating layer therefore, and for reaction with the sulfur of the sulfur hexafluoride to carry it off as gaseous sulfur dioxide.

A further feature of the present invention thus is to admix with the gas supplied to the reactor oxygen or an oxygen-containing gas (e.g. air). It has been found, according to this invention, that sulfur hexafluoride is substantially noncorrosive at temperatures below about 500° C. so that an apparatus for carrying out the fluorination of uranium compounds as described hereinafter need not be composed of noncorrosive or corrosion-resistant materials in those portions of the apparatus in which the sulfur hexafluoride is utilized at a temperature below 500° C.

We have observed that it is essential that the nuclear fuel which is to be fluorinated is treated in a finely divided state and, in the event that the fuel is not used in sufficiently finely divided form in the nuclear reactor, it must be crushed, ground or otherwise broken up so that it is treatable as a powder or fine-granulated. While reference has been made hereinabove to the use of a gaseous oxidizing media, it will be understood that the oxidizing medium can be admixed with the solid uranium compound (e.g. as manganese dioxide) as well. While fluorination of irradiated materials takes place directly from the uranium compound in the solid state, it has been found highly advantageous to carry it out in at least two stages, the first stage being the relatively low-temperature stage of 700° C. to 800° C. and preferably 750° C. whereas, in the second stage, the lower uranium fluorides are converted to uranium hexafluoride and unconverted uranium is similarly transformed at a temperature of 850° C. to 900° C. In the first stage some uranium is transformed to lower fluorides and fission fragments are driven off as the fluorides. When it is not necessary to obtain the uranium hexafluoride with a high degree of purity, it is possible to carry out the reaction most economically in a single stage at a temperature between 850° C. and 900° C. As previously indicated the present invention is particularly suitable for use for so-called "coated particles" of the type commonly used in the nuclear-fuel art. Such particles, which consist of the carbides, nitrides and oxides of the uranium encased in carbon, silicon carbides, or other carbon-contining coatings to form encapsulated fuel, can be effectively treated by the present invention for recovery of uranium in spite of the fact that the coatings are present originally in such form as to preclude attack on the uranium compounds. In this case, the nuclear fuel is subjected to mechanical comminution and/or to a treatment at a temperature of 900° C. to 1100° C. with oxygen or an oxygen-containing gas alone or in admixture with sulfur hexafluoride, and preferably in the presence of a conventional combustion catalyst. The resulting reaction strips the carbonaceous compound encapsulating the fuel and carries it away as a gas (generally $CO_2$). It has been found to be especially advantageous to carry out the reaction in a conventional laminar-vortex furnace which may be lined with or composed of a refractory material resistant to corrosion. Suitable materials include sintered clay-type ceramics, fluorspar or the like. The proportions of oxidizing gas and sulfur hexafluoride in the gas stream are, in general, determined by the temperature of the reaction. It has, however, been found that proportions between substantially 1:1 by volume and 1:2 are effective, these proportions being only given to indicate orders of magnitude since they may vary widely in practice. Moreover, it has also been found that it is frequently advantageous to mix the nuclear fuel with an inert material in, for example, a proportion of substantially 1:2. The materials noted to be most satisfactory are fused corundum, fluorspar and the like. The uranium hexafluoride is recovered by condensation, gases being treated for decontamination of the hexafluoride effluent stream with conventional methods in sodium-fluoride columns or the like with conventional absorption-desorption sycles. A particular advantage of the present invention lies in the relative simplicity and economic character of the reaction inasmuch as sulfur hexafluoride is nonpoisonous. It is also advantageous in that it is not necessary to provide anticorrosion material after the sulfur hexafluoride is cooled to a temperature below 500° C. so that only the reaction vessel (e.g. the vortex chamber or rotary-tube reactor), the absorption-desorption columns and condensers need be composed of the more expensive material. Further, the reconversion of excess fluorine by reaction with sulfur is advantageous as the reaction is carried out rapidly and can be used to eliminate the minor amounts of fluorine entrained by the gas and to yield commercially usable products such as the sulfur hexafluoride which can be recycled.

Other objects, features and advantages of this invention will become more readily apparent hereinafter with respect to the following description and examples, reference being made to the accompanying drawing in which the sole figure is a flow diagram illustrating successive stages in a process for recovering uranium as uranium hexafluoride from coated fuel-element particles subjected to neutron flux in a nuclear reactor.

Particles of a fuel element composed advantageously of the carbides, nitrides or oxides of uranium or mixtures of thorium with the latter and coated with carbon or silicon carbide as described in the commonly assigned copending application Ser. No. 498,786, filed October 20, 1965, entitled Fuel Element for Liquid-Cooled Nuclear Reactors, after being subjected to a neutron flux in such nuclear reactor, are comminuted by conventional grinding, chopping or crushing means diagrammatically represented at Z. The comminuted particles, or a size less than the several hundreds of microns at which they were originally constituted, are fed to a supply bin B from which they are introduced into a gas stream generated by a pump P. The latter represents any source of oxygen and/or nitrogen under pressure, the gas being used to entrain the finely divided uranium compound to the junction with a sulfur hexafluoride line entering a laminar-vortex furnace W. The sulfur hexafluoride is supplied via a pressure cylinder B to a metering device R$o$ of the type known as a rotameter and, from this device, to the laminar-vortex furnace W. From the furnace W, which is maintained during the reaction at a temperture above 800° C. and preferably between 850° C. and 900° C., the uranium hexafluoride is led successively through a pair of sodium-fluoride towers $S_1$ and $S_2$ in which contaminating materials and substances are removed from the gas stream by absorption so that the uranium hexafluoride produced in the furnace W enters a condenser K maintained at −30° C. to −40° C. at which the solid uranium hexafluoride is collected at L. Excess fluorine is reacted at R with sulfur in the conventional manner to produce sulfur hexafluoride which is fed back to the rotameter R$o$ for supply to the vortex furnace W as part of the sulfur hexafluoride component. In the event the sulfur hexafluoride formed at R cannot advantageously be returned to the reactor W, the fluorine compounds are supplied to an exhaust-gas magazine F from which it can be removed for further use. The precipitated radioactive impurities and contaminants of the furnace W and the towers $S_1$ and $S_2$ are collected at A. The pipe system and reactors from the laminar-vortex furnace W through the cooling assembly K, L is composed of corrosion-resistant material such as stainless steel or the like while the remaining piping and vessels can be composed of ordinary materials.

*Example I*

Into a laminar-vortex furnace heated to a temperature of 900° C. for a period of 10 minutes, a gas mixture of sulfur hexafluoride and oxygen containing 10 grams of $U_3O_8$ is injected. The gas mixture contains sulfur hexafluoride and oxygen in a 1:1 volume proportion and the velocity of injection is approximately 0.4 liter per minute. The furnace is a vertical reaction tube of ceramic with a conical bottom with a length of 50 cm., an internal diameter of 2.5 cm. and a wall thickness of 0.25 cm. The uranium compound is introduced by a pipe or duct terminating at the conical portion of the furnace this duct being composed of ceramic material and being surrounded by a muffle furnace. After a reaction time of 10 minutes, the gases at the upper part of the cyclonic reactor are led to a condenser at a temperature of −40° C. within which $UF_6$ is collected. A particular advantage of the laminar-vortex reactor is that the latter requires no moving part and indeed no moving parts are required for the entire apparatus. Moreover, the reaction is carried out continuously with an excellent recovery and yield. The oxygen stream can be replaced with nitrogen or air when manganese dioxide is used in the proper stoichiometric quantity, this oxidizing agent being powdered and mixed with the uranium particles.

*Example II*

The recovery of uranium as the uranium hexafluoride is carried out, in this case, in a rotary-tube furnace with a length of approximately 1 m., an internal diameter of 4 cm. and a wall thickness of 0.4 cm. The reaction vessel is composed of pure sintered-clay ceramic material, i.e. the substance from which the reaction vessel of Example I was composed. The rotary speed of the reaction vessel during the period of the reaction is approximately 6 revolutions per minute and the reactor is heated over a length of approximately 64 cm. which length includes a reaction zone found to be about 45 cm. The rotary furnace is heated by electric-resistant elements in a resistance-heating furnace surrounding the tube and is provided with refractory plugs at the opposite extremities thereof. An inlet tube and an outlet tube are fitted to the closure member at the opposite end of the reaction tube, the inlet and outlet pipes being likewise composed of a ceramic material. A gas/solid mixture consisting of substantially 40 g. $UO_2$ and a 1:1 volume mixture of sulfur hexafluoride and oxygen is fed to the reaction zone after careful drying. The reaction zone is maintained at a temperature of approximately 850° C. In order to maintain, during the reaction, a constant proportion of oxygen and sulfur hexafluoride in the reaction mixture, a rotameter (e.g. as shown at $Ro$ in the drawing) is provided in at least one or each of the lines for supplying oxygen and sulfur hexafluoride to their common inlet pipe. It is observed that, after a reaction time of 40 minutes under the conditions indicated, there no longer is any uranium oxide $UO_2$ in the reaction zone. The reaction appears to follow the relationship $$UO_2 + SF_6 = UF_6 + SO_2$$

The consumption of sulfur hexafluoride is approximately 2.5 times that indicated by the empirical reaction scheme indicated. To precipitate the $UF_6$ formed as described above, the gaseous output of the tubular reaction vessel is supplied to a condenser whose temperature is maintained at about −30° C. within which the $UF_6$ accumulates as a solid. In both of the foregoing experiments, it was found to be desirable to admix alumina (fused corundum) or fluorspar particles with the uranium-containing compound in a weight ratio of substantially 2:1.

*Example III*

As previously indicated, the present method is also suitable for the recovery of uranium from the fuel particles of fuel elements used in nuclear reactors and the like and, especially, for the recovery of uranium from particles of this general character which are encased or coated with carbon or silicon carbide. Thus, uranium-carbide particles coated with pyrolytically precipitated carbon and with a uranium content of about 61.5% are treated in a rotary-tube furnace of the dimensions previously indicated (Example II) at a temperature of 900° C. for a period of 40 minutes with pure oxygen gas, the latter having a flow velocity of 0.4 liter per minute. This pretreatment step appears to result in a combustion or other elimination of the carbon coating of the uranium carbide particles and is followed by a treatment of the particles, thus freed from the coating, with oxygen and sulfur hexafluoride in a volume ratio of 1:2. The gas mixture is passed over the uranium-carbide particles within the tube for a period of 45 minutes with a reaction temperature during this stage being maintained at about 900° C. When the reaction was completed, i.e. all of the uranium compound was converted to vapor, it was determined that the reaction required approximately 2.8 times the gas quantity theoretically required for the reaction hypothesis with the empirical relationship $$UC_2 + UF_6 + 3O_2 = UF_6 + 2CO_2 + SO_2$$

The uranium hexafluoride ($UF_6$) was then collected by condensation as described in Examples I and II. In general, it may be stated from the foregoing examples, that an important feature of the present invention resides in the relatively short period of time required to obtain uranium in an economically usable compound (i.e. uranium hexafluoride) from materials which have heretofore been considered difficult to treat; the reaction appears to be highly efficient in the sense that practically complete recovery of the uranium is obtained at a low cost and the reaction can be carried out in relatively simple apparatus.

The invention described and illustrated is believed to admit of many modifications within the ability of persons skilled in the art, all such modifications being considered within the spirit and scope of the appended claims.

We claim:
1. A process for the recovery of uranium from a uranium-containing substance in the solid state, comprising the steps of treating said substance in a particulate state at a temperature in excess of about 800° C. with sulfur hexafluoride to produce uranium hexafluoride from at least part of the uranium of said substance; and collecting the uranium hexafluoride thus produced.

2. A process as defined in claim 1 wherein said temperature ranges between 850° C. and 900° C.

3. A process as defined in claim 1 wherein said substance is reacted with said sulfur hexafluoride in the presence of an oxidizing medium selected from the group which consists of oxygen gas and manganese dioxide and said substance is admixed with fused corundum or fluorspar in a weight ratio of 1:2.

4. A process as defined in claim 1 wherein the treatment is carried out by treating said substance with gaseous sulfur hexafluoride in a laminar vortex.

5. A process as defined in claim 1 wherein the treatment with said sulfur hexafluoride of said substance is carried out in two successive steps including a first step at a temperature ranging between 700° C. and 800° C. in which fission fragments in said substance are fluorinated and a second step at a temperature ranging between substantially 850° C. to 900° C. wherein any lower uranium fluorides formed in the first step are converted to uranium hexafluoride.

6. A process as defined in claim 1 wherein said substance is an irradiated nuclear-fuel material containing particles of at least one uranium compound encased in a carbon-containing layer, said process further comprising the step of pretreating said material with an oxidizing medium selected from the group of oxygen gas and manganese dioxide at a temperature ranging between substantially 900° C. and 1100° C. to strip said layer from the uranium compound.

7. A process as defined in claim 6 further comprising the step of comminuting said material prior to subjecting it to treatment with said oxidizing medium at said temperature of 900° C. to 1100° C.

8. A process as defined in claim 6 wherein the preliminary treatment of said material with said oxidizing medium is carried out in the presence of a combustion catalyst.

9. A process as defined in claim 1 wherein the uranium hexafluoride is collected by condensation at a temperature of the gases evolved in the reaction of said sulfur hexafluoride with said substance to a temperature of about −30° C. to −40° C., further comprising the step of recirculating sulfur hexafluoride from the gases subject to cooling to the reaction thereof with said substance while maintaining the recirculated sulfur hexafluoride at a temperature below about 500° C.

10. A process as defined in claim 1 wherein said sulfur hexafluoride is admixed with gaseous oxygen prior to reaction with said substance.

References Cited

UNITED STATES PATENTS 2,904,394  9/1959  Smith _____ 23—352

CARL D. QUARFORTH, *Primary Examiner.*

L. DEWAYNE RUTLEDGE, *Examiner.*

S. TRAUB, R. L. GRUDZIECKI, *Assistant Examiners.*